(12) United States Patent
Walker et al.

(10) Patent No.: US 6,655,247 B1
(45) Date of Patent: Dec. 2, 2003

(54) MACHINE TOOL

(75) Inventors: Bernd Walker, Esslingen (DE); Helmut Link, Aichwald (DE); Dietmar Hafla, Baltmannsweiler (DE); Anton Haberkern, Wendlingen (DE)

(73) Assignee: Index-Werke GmbH & Co. - KG Hahn & Tessky, Esslingen (DE)

( * ) Notice: Subject to any disclaimer, the term of this patent is extended or adjusted under 35 U.S.C. 154(b) by 174 days.

(21) Appl. No.: 09/718,141

(22) Filed: Nov. 21, 2000

(30) Foreign Application Priority Data

Dec. 1, 1999 (EP) .............................. 99123817

(51) Int. Cl.$^7$ .............................. B23B 3/20; B23B 5/00
(52) U.S. Cl. .......................................... 82/122; 82/132
(58) Field of Search ....................... 82/122, 129, 133, 82/134, 137, 138, 139, 1.11, 1.4, 1.5, 118

(56) References Cited

U.S. PATENT DOCUMENTS

| | | | |
|---|---|---|---|
| 4,742,739 A | | 5/1988 | Yamaguchi et al. |
| 5,697,270 A | * | 12/1997 | Link .............................. 82/129 |
| 5,715,729 A | | 2/1998 | Toyama et al. |
| 6,000,305 A | * | 12/1999 | Link .............................. 82/1.11 |
| 6,085,622 A | * | 7/2000 | Link et al. ..................... 82/122 |
| 6,158,312 A | * | 12/2000 | Link et al. ..................... 82/122 |

FOREIGN PATENT DOCUMENTS

| | | |
|---|---|---|
| DE | 19614641 A1 | 10/1997 |
| DE | 19650360 A1 | 5/1998 |
| EP | 0534585 A2 | 3/1993 |
| FR | 2779080 A1 | 12/1999 |

* cited by examiner

*Primary Examiner*—Henry W. H. Tsai
(74) *Attorney, Agent, or Firm*—Leydig, Voit & Mayer, Ltd.

(57) ABSTRACT

In order to use moved masses which are as small as possible in a machine tool, in particular for the rotary machining of workpieces, comprising a machine frame, a tool carrier, a workpiece carrier, it is proposed to provide a parallel kinematic arrangement, which has three parallelogram guides connected in an articulated manner at one end to a receiving means for one of the carriers and at the other end to a slide and an N/C-controlled linear drive for each slide and by which the carrier arranged on the receiving means is movable relative to the machine frame in a three-dimensional movement space.

29 Claims, 8 Drawing Sheets

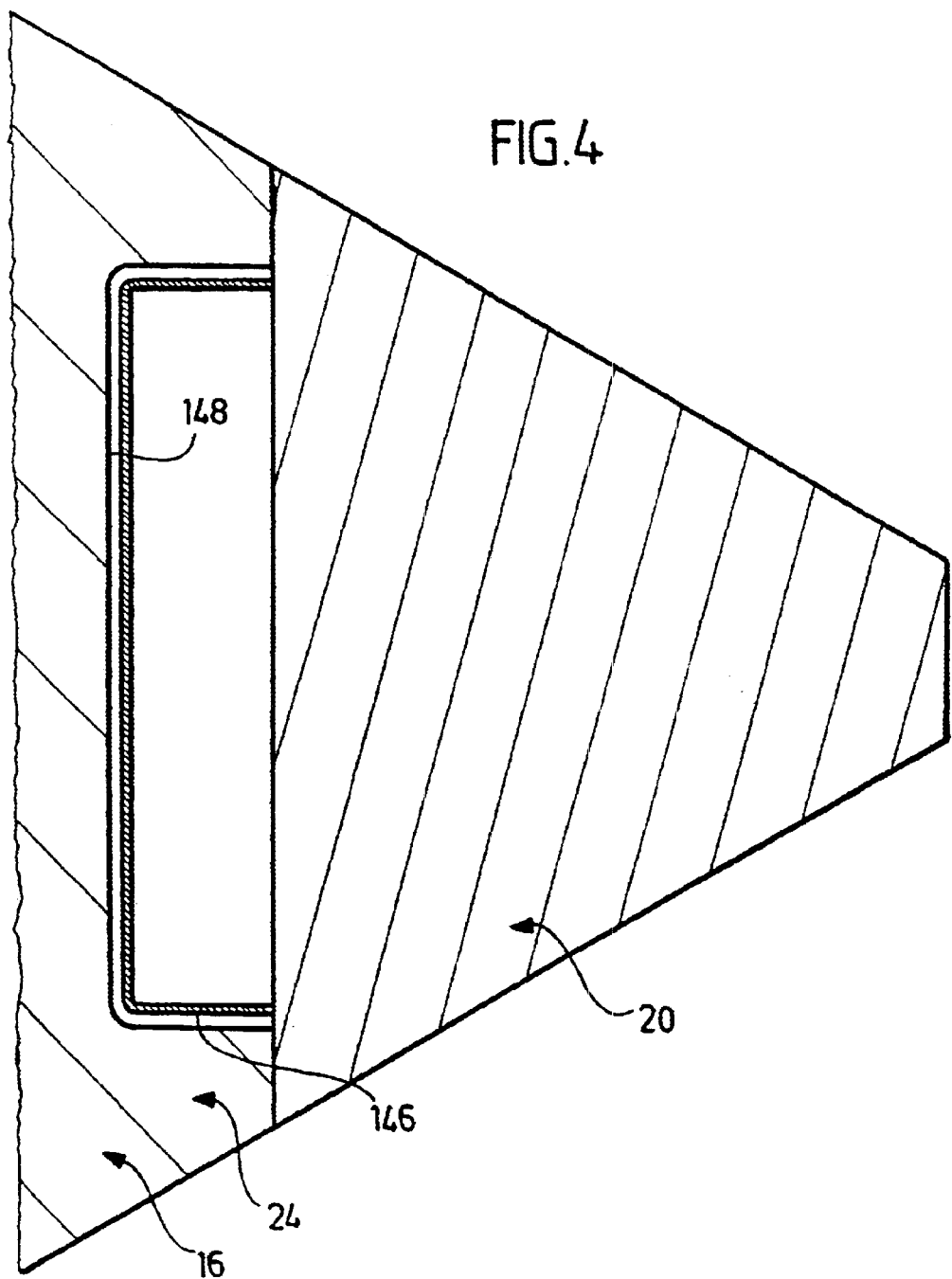

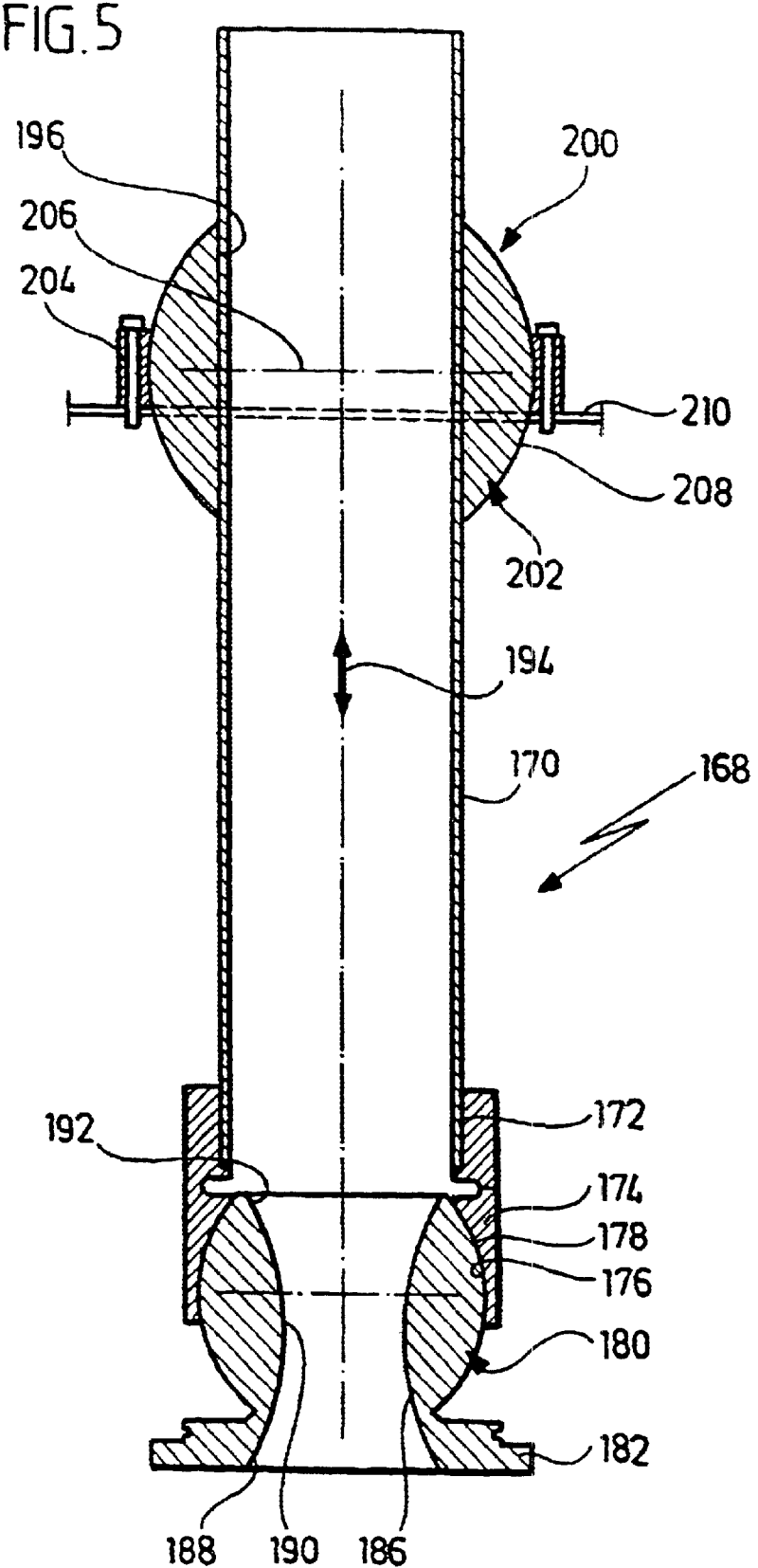

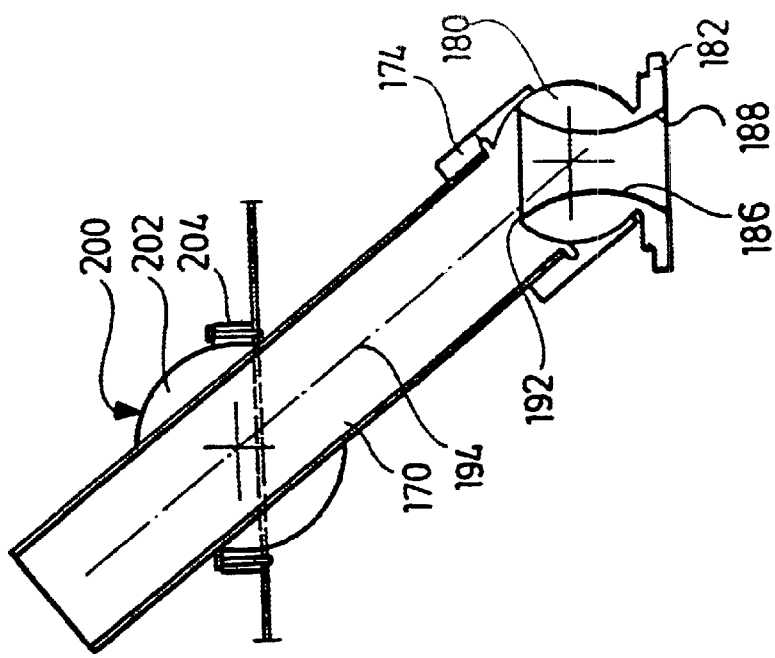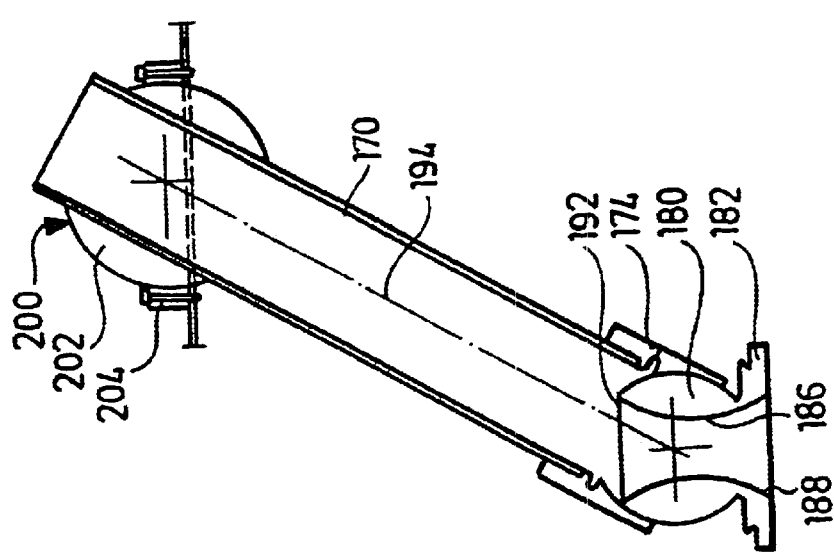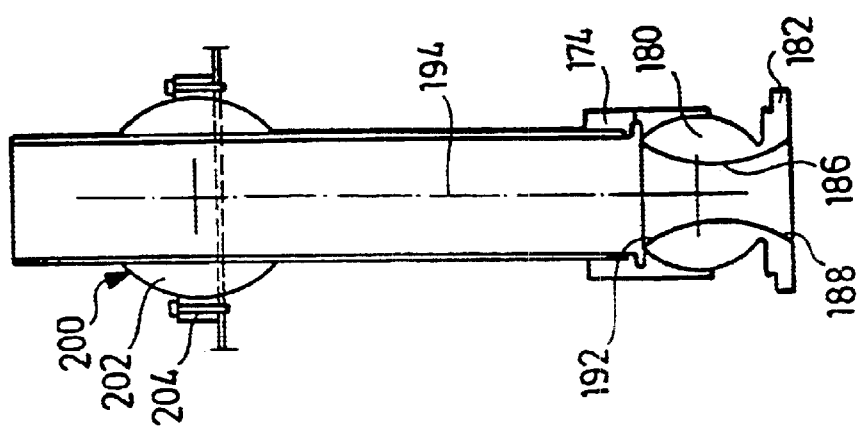

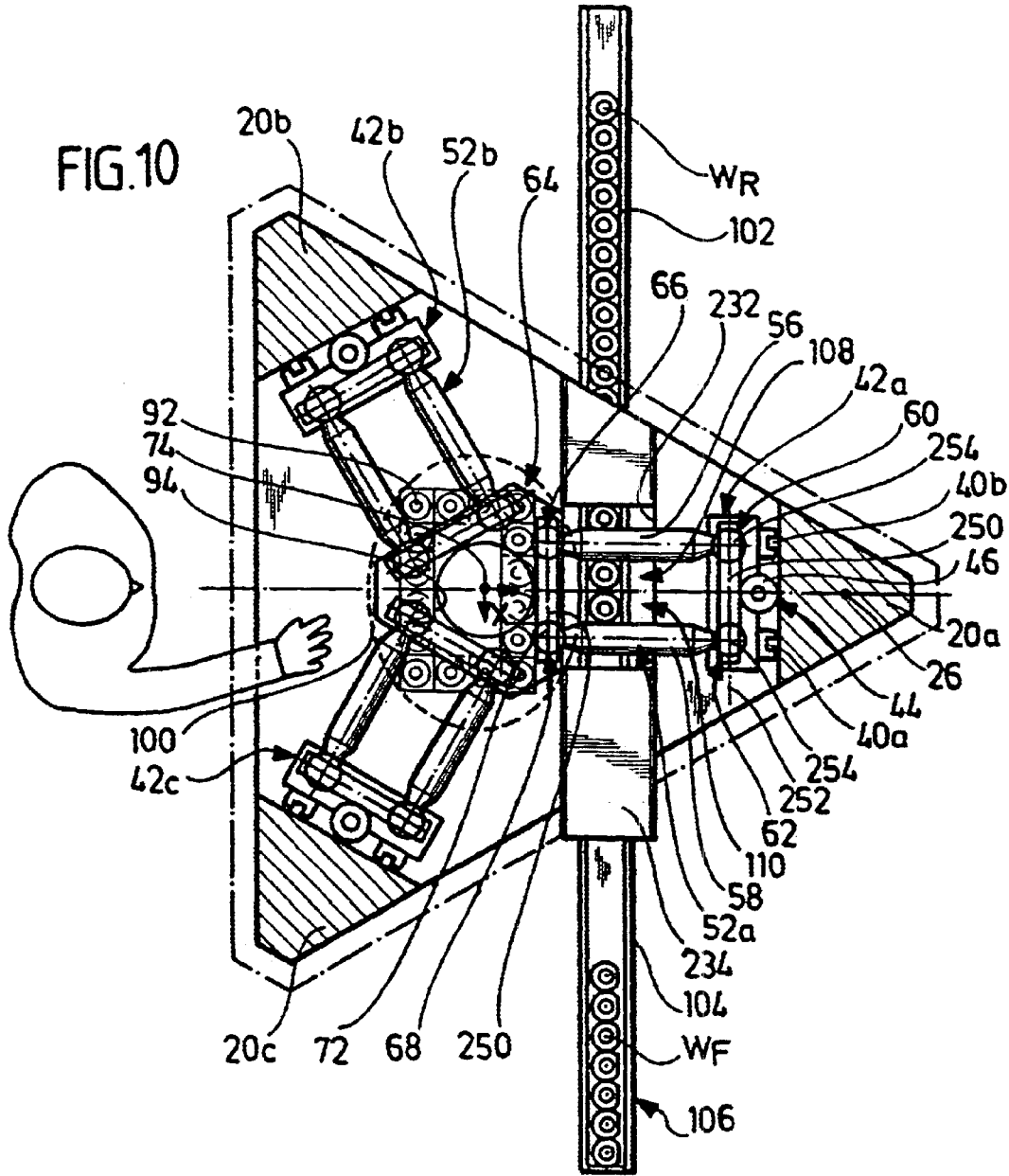

MACHINE TOOL

The invention relates to a machine tool, in particular for the rotary machining of workpieces.

Machine tools of this type are known, the tool carrier and the workpiece carrier being movable relative to each other in these known machine tools as a result of the fact that they are mounted directly on one or more slides movable in a linear manner relative to the machine frame.

In order to obtain three-dimensional mobility of the tool carrier and the workpiece carrier relative to each other, it is necessary to arrange at least one of the two on a cross slide.

A cross slide of this type has the drawback that in this case substantial masses have to be moved.

The object of the invention is therefore to provide a machine tool in which the moved masses can be kept as low as possible.

This object is attained according to the invention by a machine tool, in particular for the rotary machining of workpieces, in that the machine tool comprises a machine frame, a tool carrier, a workpiece carrier and a parallel kinematic arrangement, which has three parallelogram guides connected in an articulated manner at one end to a receiving means for one of the carriers and at the other end to one of the slides and an N/C-controlled linear drive for each slide and by which the carrier arranged on the receiving means is movable relative to the machine frame in a three-dimensional movement space.

The advantage of the parallel kinematic arrangement according to the invention is that the moved masses can be kept low by means of this, since each slide has to be guided movably only in one axial direction and so all the drives for the slides can be arranged on the machine frame.

In principle it would be sufficient in the case of a machine tool according to the invention for the tool carrier to be equipped with one tool. It is particularly advantageous, however, if the tool carrier can be equipped with a plurality of tools, so that as extensive a complete machining as possible can be performed by the plurality of tools.

In principle it would be possible in this case for the tools to be arranged along one direction, for example in a linear manner. It is particularly advantageous, however, for the machine tool according to the invention to be constructed when the plurality of tools are arranged in two directions and mutually spaced in each case, so that a two-dimensional matrix of tools is available.

By means of a two-dimensional matrix a plurality of tools can be arranged in a relatively small space, so that in this way the space requirement of the machine tool in particular is small despite the plurality of tools.

A particularly advantageous solution provides that the plurality of tools can be used for machining a workpiece, so that in this way a time-saving complete machining is made possible by a rapid change from machining with one tool to machining with the other tool.

In principle, in the case of the machine tool according to the invention it would be possible to provide a tool carrier in which the tools are movable relative to the machine frame. A known tool carrier of this type is a tool revolver, which may be a revolver rotatable about a revolver axis or even a linear revolver.

It is particularly advantageous for the solution according to the invention, however, in particular on account of the existing three-dimensional mobility of the receiving means, if the tool carrier is arranged stationary on the machine frame and, in particular, the tools used are arranged with such an orientation that they can be used for machining by bringing the workpiece to the tool, so that in this case exclusively the workpiece carrier is movable relative to the machine frame by means of the receiving means.

In order to ensure an optimum chip clearance it is preferably provided that chip spaces, by way of which the chips produced can be removed, are arranged between the tools.

It is particularly advantageous in this case if the tool carrier has an aperture for the removal of chips which drop down, so that these chips can be removed in a simple manner.

In this case a particularly expedient arrangement in the case of a plurality of tools provides that the tools are arranged around the aperture.

In addition, in order to obtain an expedient removal of the chips by way of the machine frame, it is preferably provided that the tool carrier is arranged in the machine frame above a recess which receives falling chips.

With respect to the arrangement of the receiving means relative to the parallel kinematic arrangement used according to the invention, more precise details have not been provided hitherto. For example, the parallel kinematic arrangement could be designed in such a way that the receiving means is supported by the parallel kinematic arrangement with respect to the machine frame, i.e. the receiving means stresses the parallelogram guides essentially with pressure.

In the case of a workpiece receiving means with a tool arranged in a suspended manner, however, this would have the disadvantage that in this case the parallelogram guides would extend on the same side as the workpiece and would restrict the operating space.

For this reason a particularly advantageous embodiment provides that the receiving means is arranged in a suspended manner on the parallelogram guides and so the latter are stressed by tension. The parallelogram guides are thus situated in a region in which they do not restrict the accessibility to the operating space and also not the operating space itself.

With respect to the workpiece receiving means it would be possible to arrange them in such a way that the workpiece rests thereon. It is particularly expedient, however, if the workpiece receiving means receives the workpiece in a suspended manner.

With respect to the design of the workpiece receiving means, no more precise details have been given in conjunction with the previous explanation of the individual embodiments. In this way, it would be possible, for example, to use a driven tool for machining a workpiece, so that it would be sufficient to use the workpiece carrier only for positioning the workpiece relative to the driven tool.

A particularly advantageous solution, however, in particular with respect to rotary machining, provides that the workpiece carrier is a workpiece spindle.

For example, in the case of the solution according to the invention the workpiece spindle could be arranged as before on the machine frame and the workpiece could be machinable by arranging the workpiece carrier on the receiving means.

It is particularly expedient, however, particularly in order to be able to integrate a workpiece manipulation in a simple manner without additional manipulation devices, if the workpiece spindle is arranged on the receiving means, so that the workpiece spindle is movable in the movement space provided for the receiving means.

To this end, it is preferably provided that the workpiece spindle is movable in the movement space in such a way that all the tools of the tool carrier can be used on the workpiece.

In this case the workpiece spindle is advantageously designed in the form of a suspended spindle, i.e. the workpiece spindle is arranged on the receiving means in such a way that the workpiece receiving means points in the direction of a base area of the machine tool.

It is particularly expedient if the workpiece spindle is a vertical spindle, i.e. the spindle axis is designed in such a way that it extends substantially parallel to the vertical. With a vertical spindle of this type, gripping and/or depositing a workpiece can advantageously be combined with machining, particularly in the case of small parts. In this way, for example, in particular the three-dimensional mobility of the workpiece spindle can be utilized expediently in order to grip and/or to machine a workpiece available on a conveying device and subsequently to deposit it again.

In addition to the movable workpiece spindle, however, the concept according to the invention can also advantageously provide a counter spindle which is arranged adjacent to the tools on the machine frame.

In this case, either tools arranged separately should then be provided which can be arranged fixed on the machine frame for example, provided that the counter spindle is movable, or it is possible to provide tools on the receiving means for example for the workpiece spindle at the same time, so that machining is possible when the counter spindle is stationary.

With respect to the design of the machine frame itself, no more precise details have been given in conjunction with the previous explanation of the individual embodiments. In this way, a particularly advantageous embodiment provides that the machine frame comprises a base body which can be placed on a setting area and supports projecting therefrom for the linear drives.

In this case all the supports preferably extend parallel to one another away from the base body.

A particularly expedient embodiment of the solution according to the invention provides that the base body has a substantially triangular cross-sectional shape in a horizontal cross-sectional plane, and a carrier is arranged in each corner region.

In this case it is particularly expedient if the base body has substantially the cross-sectional shape of an isosceles [sic] triangle in the horizontal cross-sectional plane, so that the carriers are arranged at substantially equal angular distances about a median axis.

A particularly stable solution for the machine frame is provided when the carriers projecting from the base body are connected to one another by means of a cross-bracing member on their side remote from the base body, thus additionally resulting in stabilization of the carriers relative to one another.

By means of a cross-bracing member of this type, a sort of cage structure—in which the carriers are integrated—is formed in conjunction with the base body.

To this end an alternative solution provides that the carriers are stabilized with respect to the base body by wall members. Such a solution, however, has the drawback of restricted accessibility as compared with the cage structure of the machine frame according to the invention.

In this case a particularly expedient solution provides that the carriers are connected to one another by a one-piece cross-bracing member on their side remote from the base body.

With respect to the movement path of the slide, no more precise details have like-wise been given in conjunction with the previous explanation of the individual embodiments. In this way, a particularly advantageous embodiment provides that a movement path of the slides extends between the base body and the cross-bracing member.

In this case, as large a slide path as possible is made available in order to obtain as large a movement space as possible for the movement of the receiving means.

In order to protect the slide guide and the linear drive from chips, it is preferably provided that the respective linear drive is protected by a dimensionally rigid covering which is jointly moved with the respective slide in a rigid manner.

In this case it is particularly advantageous if in all positions of the slide the covering extends at least from the slide as far as the base body and so the region of the linear drive situated to a pronounced extent in the chip clearance is protected to an optimum degree.

Since according to the invention the covering is to be jointly movable with the slide in a rigid manner and thus should not be changeable in shape itself, it has to have a length which substantially corresponds to the maximum path of travel of the slide. For this reason it is advantageously provided that the covering enters a covering-receiving means.

A covering-receiving means of this type could for example be a covering member additionally provided on the base body for example.

A solution which is particularly expedient in terms of simplicity provides, however, that the covering enters a recess provided in the base body for it.

In this case the recess is preferably dimensioned in such a way that only a slight gap remains between it and the covering, so that the gap is already sufficient to prevent the penetration of further chips.

It is also provided within the scope of the invention, however, that a wiping means is provided between the covering and an entry opening of the recess for the covering.

In order to ensure that chips are removed, even in the case where these chips enter the recess, it is preferably provided that the recess in the base body is open on the side opposite the entrance for the covering, so that it is possible for the chips and/or fluid from the recess to pass out again on the side opposite the entrance to the covering.

In addition, an advantageous embodiment of the solution according to the invention provides that one respective dimensionally rigid covering—moved jointly with the slide—for the linear drive extends between the respective slide and a closure of the operating space opposite the base body. In this way, this part of the linear drive can also be protected in an advantageous manner.

In this case it is preferably provided that in all positions of the slide the covering extends at least as far as the wall of the operating space opposite the base body.

The covering can be arranged in a particularly simple and expedient manner relative to the slide if it directly adjoins a housing of the slide and is held thereon.

In conjunction with the previous description of individual embodiments of the solution according to the invention, no more precise details are given as to how a line train is to be guided to the receiving means which is movable by the parallel kinematic arrangement, in particular since this line train has to be guided in the operating space in which the receiving means moves with the carrier held thereon.

In this way, it is particularly advantageous if a line train to the receiving means movable by the parallel kinematic arrangement is guided by a line-train protection movable with respect to the carrier held on the receiving means and the machine frame.

A line-train protection of this type is used to protect the line train from any type of damage from chips flying about in the operating space and lubricant and coolant splashing in the operating space.

In this case it is particularly advantageous if the line-train protection comprises a tube which is mounted in a pivot bearing mounted on the machine frame so as to be displaceable in its longitudinal direction.

This means that the tube is pivotable with respect to the machine frame on account of the pivot bearing on the one hand and is also mounted displaceably in the pivot bearing in its longitudinal direction relative to the pivot bearing on the other hand, so that, starting from the pivot bearing, the tube can extend by a different length in the operating space.

In this case a particularly expedient solution provides that the tube is mounted in a pivotable manner by means of the pivot bearing on the wall of the operating space opposite the base body and passes through the said wall.

Widely different solutions are possible with respect to the design of the pivot bearing. A particularly simple and inexpensive solution provides that the pivot bearing comprises a pivot member for receiving the tube, which [pivot bearing] is mounted in an articulated manner in a pivot-member bearing mounted stationary on the machine frame.

In this case the pivot member is preferably designed in such a way that it has a spherical face and is mounted therewith in the pivot-member bearing.

A spherical face of this type has the advantage that it ensures an optimum pivotability on the one hand and it also has the advantage that it also allows rotation about the tube itself on the other hand.

In addition it is also advantageously provided that the tube is also mounted in the pivot member so as to be rotatable about its longitudinal axis, so that relative rotation can be compensated by these mountings alone.

With respect to the design of the parallelogram guides, no more precise details have been given in conjunction with the previous description of the individual embodiments. In this way, a particularly advantageous embodiment provides that the parallelogram guides comprise two parallelogram braces extending constantly parallel to each other in all the positions of the receiving means in the operating space. As a result of such parallelogram braces which extend constantly parallel to each other, an advantageous stabilization of the position of the receiving means in the operating space is achieved.

In order to protect the articulated connexion between the parallelogram braces and the receiving means from the ingress of chips and the ingress of coolant and/or lubricant on account of their position which is relatively close in the case of the workpiece, it is preferably provided that the parallelogram braces are held on the receiving means by means of a joint situated below a protection device.

In this case the protection device is preferably designed in such a way that it comprises a covering member which is connected to a guiding head on the respective parallelogram braces in a movable manner.

In order to guide the covering member precisely, it is preferably provided that the covering member is movable on a guiding face in order to follow the movements of the guiding head when the parallelogram brace is moved.

In order to provide a dirt-tight connexion between the covering member and the respective parallelogram brace, it is preferably provided that in all positions of the parallelogram brace the covering member rests against the guiding head with a guiding lug relative to the receiving means, a guiding lug of this type being formed as an aperture in the covering member in the simplest case.

In this case a particularly preferred solution provides that the guiding head has a shape which in each position of the covering member determined by the guiding face has a bearing contour with substantially the same shape for the guiding lug, so that in all positions of the respective parallelogram brace the guiding lug can rest against the guiding head in a manner closing it off tightly.

A particularly advantageous embodiment provides that the joints between the parallelogram braces and the slide are also protected by a suitable protection device.

Further features and advantages of the invention are the subject of the following description as well as the graphic illustration of two embodiments. In the drawing FIG. 1 is a vertical section along the line X—X in FIG. 2 through a first embodiment of a machine tool according to the invention;

FIG. 4 is a section along line 4—4 in FIG. 1;

FIG. 5 is a longitudinal section through a line-train protection of the machine tool according to the invention in a starting position;

FIG. 6 is an illustration of the line-train protection in accordance with FIG. 5 with the receiving means present in a starting position and movable by the parallel kinematic arrangement;

FIG. 7 shows a further position of the line-train protection, in which the receiving means has been moved laterally and in the direction of a base member as compared with FIG. 6;

FIG. 8 shows a further position of the line-train protection according to the invention, in which the receiving means has been moved away from the base member and to the side as compared with FIG. 6;

FIG. 10 is a section corresponding to FIG. 2 through the second embodiment.

Figure 1:
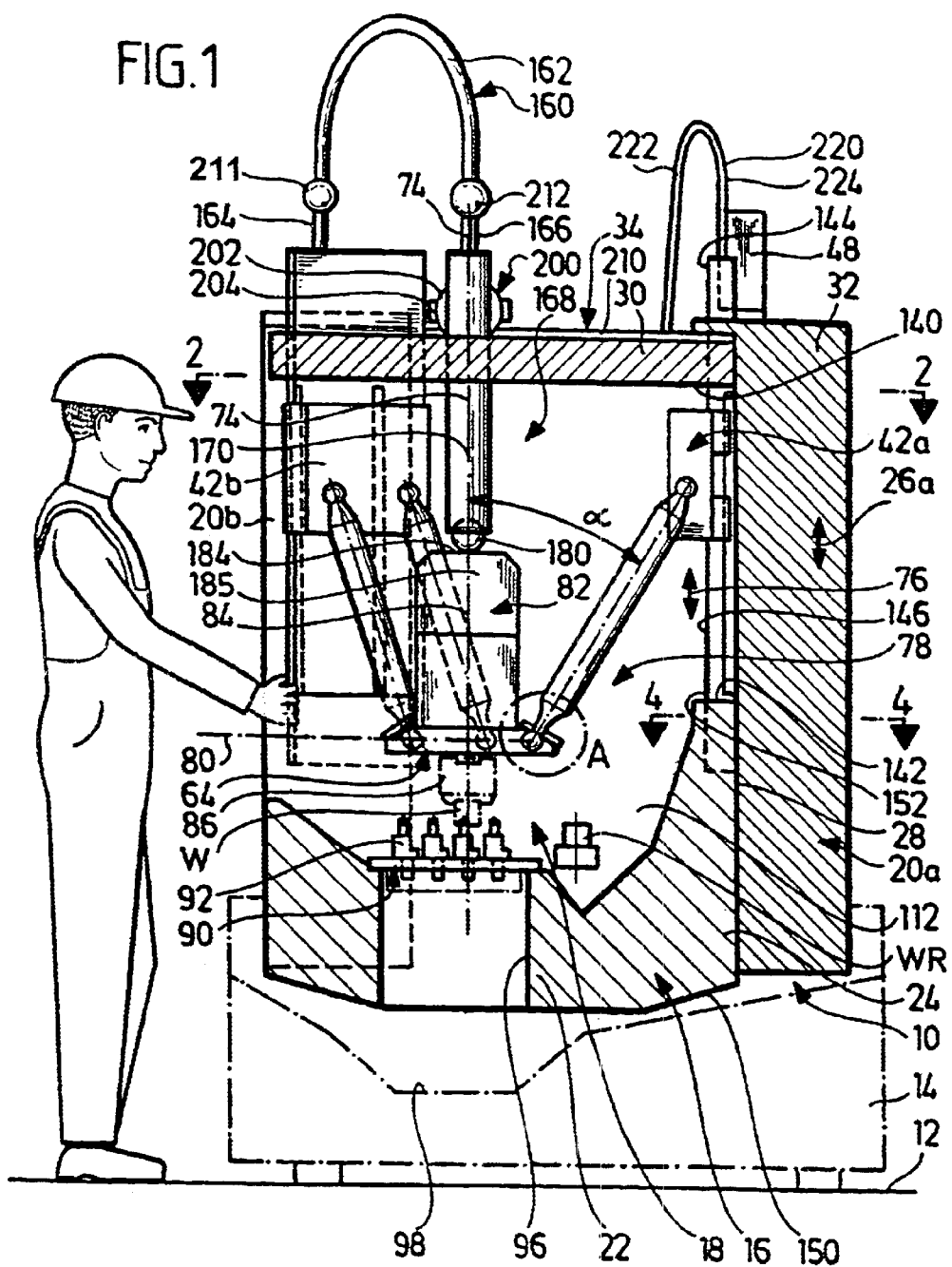

A first embodiment of a machine tool according to the invention, illustrated in FIGS. 1 and 2, comprises a machine frame designated 10 as a whole and having a substructure 14 which is rests on a base area 12 and which supports a base body 16 which extends on one side, preferably below an operating space 18 between altogether three carriers 20a, 20b and 20c and connects them together.

The base body 16 preferably has a substantially triangular cross-sectional shape as viewed in a horizontal plane, the carriers 20 being arranged in the corner regions.

The base body 16 advantageously has an inner region 22 which is adjoined at each of the carriers 20 by a carrier receiving means 24 by means of which the respective carrier 20 can be connected.

In this case the carrier receiving means 24 is extended in the longitudinal direction 26 of the respective carrier 20 with respect to the inner region 22 of the base body 16 in order to form a bearing face 28 which receives the respective carrier 20 in a stable manner and against which the respective carrier 20 rests.

Each of the carriers 20 extends starting from the base body 16 with its longitudinal direction 26 parallel to the longitudinal directions 26 of the respective other carriers away from the base body 16 substantially in the vertical direction as far as a cross-bracing member 30 which connects the carriers 20 rigidly together in the region of their ends 32 opposite the base body 16 and, in addition, rests on one side of the operating space 18 opposite the base body 16.

In this way, the cross-bracing member 30, the three carriers 20 and the base body 16 together form a cage structure which is designated 34 as a whole and inside which the operating space 18 is arranged, the cage structure 34 having access windows 36a 36b and 36c respectively situated between two carriers 20a and 20b or 20b and 20c or 20c and 20a respectively as well as between the cross-bracing member 30 and the base body 16, an access to the operating space 18 being possible by way of the access windows 36a, 36b and 36c, without the stability of the cage structure 34 being adversely affected.

In addition, each of the carriers 20 is provided with two slide guides 40a, 40b which extend parallel to each other and which likewise extend in the longitudinal direction 26 of the respective carriers 20, namely preferably between the base body 16 and the cross-bracing member 30.

One respective slide 42 designated 42 as a whole is guided on these slide guides 40 and is drivable by a linear drive 44 which is associated with this slide 40 and which comprises for example a spindle 46 and a drive motor 48 which is arranged in the region of the end 32 of the respective carrier and is used to drive the spindle 46 in an N/C-controlled manner. In addition, the linear drive 44 further comprises a spindle nut 50 which is mounted fixed on the respective slide 42, so that the respective slide 42 can be positioned in an N/C-controlled manner by means of the linear drive 44 in an adjusting device 52 extending parallel to the direction 26.

Each of the slides 42 has a parallelogram guide designed 52 as a whole engaging thereon, which comprises two parallelogram braces 56 and 581 which extend with their longitudinal directions 54 parallel to each other and which in turn are of the same length and are held on the respective slide 42 by a joint 60 and 62 pivotable about two axes.

N. B. The original German reads "which two parallelogram braces 56 and 58 embrace . . . ". It has been assumed in the translation that the plural verb umfassen should be singular (umfasst), which would have the effect of making the subject of the clause the object and vice versa.

In addition, the parallelogram braces 56 and 58 are held on a receiving body designated 64 as a whole likewise by means of joints 66 and 68 respectively which correspond to the joints 60 and 62, the joints 60 and 62 as well as the joints 66 and 68 being arranged at the same distance from one another and thus also each being situated on a straight connecting line 70 and 72 respectively which are guided parallel to each other in all positions by the parallelogram braces 56 and 58.

A parallel guide 52 of this type thus allows the receiving body 64 to move in the space relative to the corresponding slide 42, for example to the slide 42a, each of the joints 66 and 68 being movable with respect to the corresponding joint 60 and 62 respectively on a portion of a spherical face and, in addition, being constantly guided by the two parallelogram braces 56 and 58 of the receiving body 64 that the straight connecting line 72 remains orientated parallel to the straight connecting line 70.

According to the invention a parallelogram guide 52a, 52b and 52c of this type is provided between the receiving body 64 and each of the three slides 42a, 42b and 42c, the parallelogram guides 52a to 52c being arranged at equal angular distances around a median axis 74 in a basic position in which all the parallelogram braces 56, 58 extend at a right angle to the straight connecting lines 70 and 72, and, in addition, the parallelogram braces 56 and 58 form with the median axis 74 an angle α which is smaller than 90°, and preferably smaller than 45°.

As a result of the displacement of the individual slides 42a to 42c along the slide guide 40 in an adjustment device 76, the possibility now exists of moving the receiving body in the operating space 18 inside a movement space 78 which extends transversely to the median axis 74 and around the median axis 74 as well as in the direction of the median axis, so that the receiving body 64 can occupy any desired spatial position inside the three-dimensional movement space 78, an orientation plane 80 of the receiving body 64 always retaining the same orientation with respect to the longitudinal directions 26 of the carriers 20, i.e. the receiving body 64 is orientated with its orientation plane 80 in such a way in all positions inside the movement space 78 that its orientation plane 80 extends parallel to the positions of the orientation plane 80 in the other spatial positions inside the movement space 78.

In the case of the machine tool according to the invention a workpiece spindle designated 82 as a whole and having an axis 84 extending at a right angle to the orientation plane 80 is provided on the receiving body 64, the workpiece spindle 82 passing through the receiving body 64 and carrying—on a side facing the base body 16—a workpiece receiving means 86 which is arranged in a suspended manner and in which a workpiece W can be received in a suspended manner and can be driven so as to rotate about the spindle axis 84.

Figure 2:
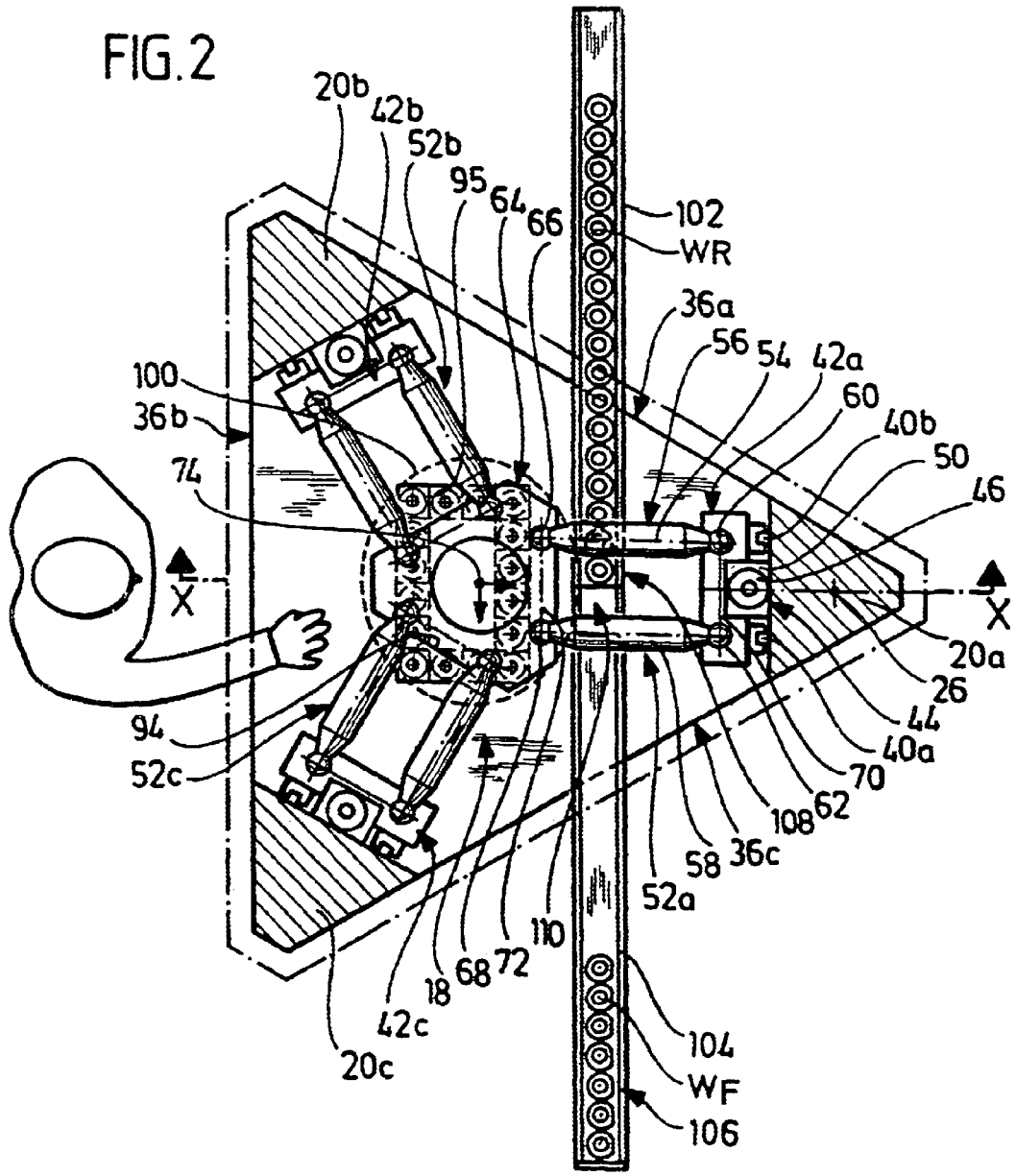
FIG. 2 is a section along line 2—2 in FIG. 1.

A tool carrier designated 90 as a whole, which carries a plurality of tools 92 which—as illustrated in FIG. 2—are arranged in a two-dimensional arrangement on the tool carrier 90, is provided on the base body 16, preferably stationary relative thereto, in order to machine this workpiece W.

It is preferable, as illustrated in FIG. 2, for the tools 92 to be arranged in their two-dimensional arrangement around an aperture 94 which is used for the advantageous removal of chips. A preferred embodiment provides, as illustrated in FIG. 2, a rectangular matrix of tools 92 for example around the central aperture 94, chip spaces 95 preferably being provided between the tools.

It is also possible, however, to select any desired matrix shapes for the two-dimensional arrangement of the tools 92 on the tool carrier 90, provided that the tools 92 have an adequate number of apertures 94 for removing the chips.

In order to assist the removal of the chips, the base body 12 is provided with a recess 96 in its inner region 22, the tool carrier 90 being arranged in such a way that the tools 92 are positioned in particular with the aperture 94 above the recess 96 and chips which drop from all sides of the tools 92. i.e. both chips falling through the aperture 94 and chips dropping outside the matrix of the tools 92, preferably drop into the recess 96 in the base body 16 and pass through the latter into a chip trough 98 which extends in the substructure 14 preferably over the entire extension of the base body 16.

In this case, the tool carrier 90 is preferably arranged in such a way that all the tools 92 are situated in a central region 100 of the operating space 18 which is situated substantially at the same distance from all the carriers 20 and preferably extends around the median axis 74. In this central region 100 of the operating space the movement space 78 also allows the greatest possible movability of the workpiece receiving means 86 together with the workpiece in all three spatial directions relative to the tools, so that this central region is intended for the machining of the workpieces W.

Since the orientation plane 80 of the receiving body always extends in the same orientation with respect to the longitudinal directions 26 as a result of the parallelogram guides 52, this necessarily ensures that the spindle axis 84 around which the workpeace receiving means 86 is rotatable always extends with the same orientation, i.e. parallel to the longitudinal directions 26 of the carriers 20 for example, and so the workpiece receiving means 86 also has exactly the same orientation, for example a substantially vertical orientation, irrespectively of on which of the tools 92 a machining of the workpiece W takes place.

The machine tool according to the invention with the spindle axis 84 preferably orientated vertically is advantageously suitable, however, not only for machining the workpieces W by means of the tools 92, but also for integrating the manipulation into the machining process at the same time.

For this reason, for example, a workpiece-feed device 102 is provided, which conveys blank workpieces $W_R$ through one of the access windows, for example the access window 36a, into the operating space 18 and makes it available outside the central region 100 for transfer through the workpiece receiving means 86.

In the same way it is possible to provide a workpiece-removal device 104, which, likewise outside the central region 100, is able to take up finished workpieces $W_F$ and to convey them out of the operating space 18 through one of the access windows, for example the access window 36b.

In the simplest case, the workpiece-feed device 102 and the workpiece-feed [sic] device 104 can be combined to form a common conveying device 106 which conveys blank workpieces $W_R$ from one side into the operating space 18, for example into a transfer position 108 close to the central region 100, and which takes up finished workpieces $W_F$ in a take-up position 110.

Alternatively, however, it is likewise possible for the transfer position 108 and the take-up position 110 to be provided on different sides of the central region 100.

In the case of the machine tool according to the invention it is particularly advantageous, however, if the transfer position 108 and/or the take-up position 110 is or are situated in a corner region 112 of the operating space, which extends in each case between the tool carrier 90 and one of the carriers 20 of the machine frame 10.

Figure 3:
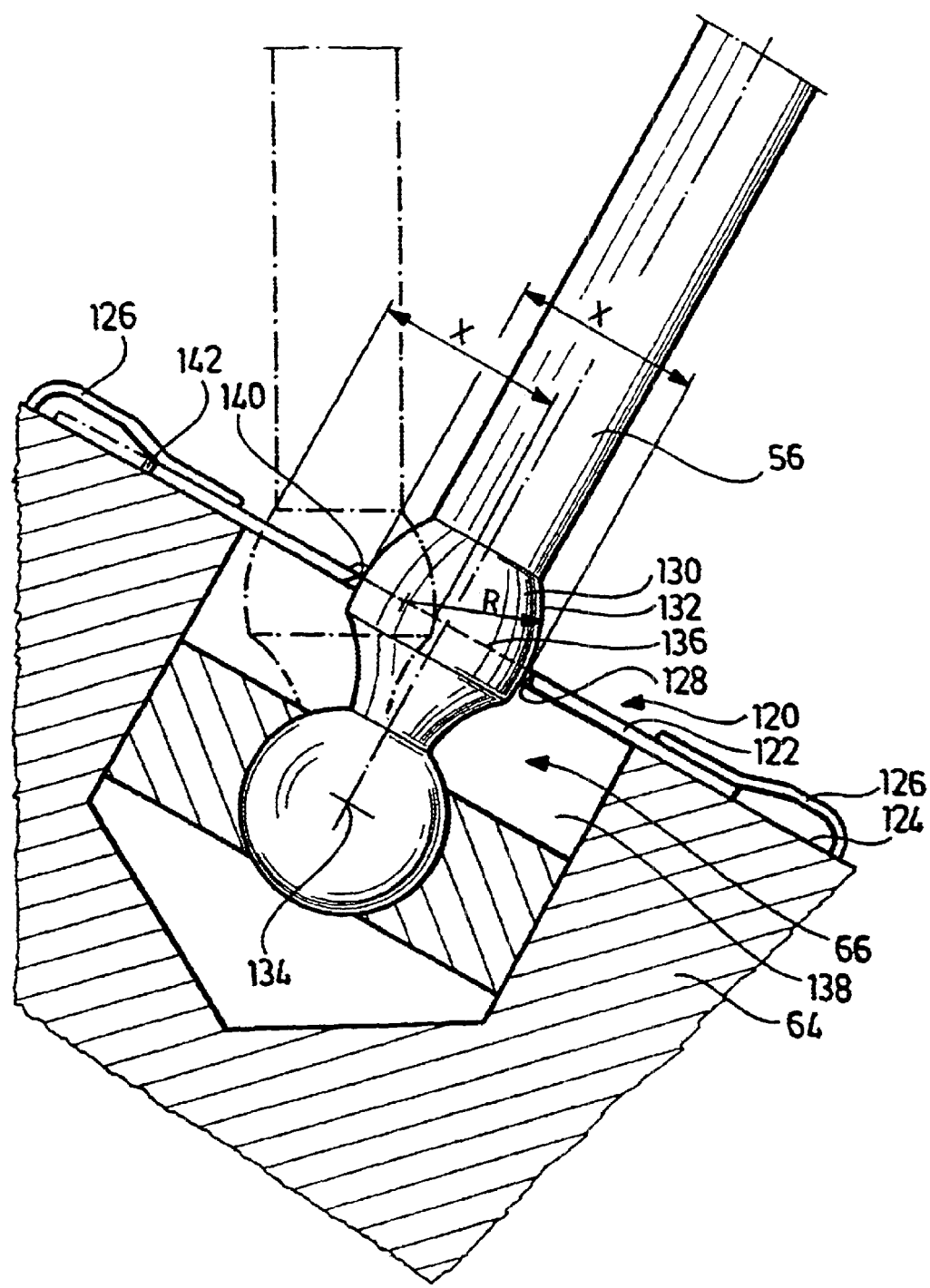
FIG. 3 is an enlarged illustration of the detail A in FIG. 1.

In order to protect the joints 66 and 68, which are always arranged in the operating space 18 close to the workpiece W to be machined, from dirt and, in particular, also chips, these joints 66 and 68 are protected by a protection device designated 120 as a whole, as illustrated on an enlarged scale in FIG. 3 with reference to the joint 66.

This protection device 120 on the one hand comprises a covering member 122, for example constructed in the form of a cover plate which rests on a guide face 124, formed for example by a flat surface of the receiving body 64, and which is movable in two dimensions relative to the guide face 124.

Furthermore, spring members 126 are provided which hold the covering member 122 resting on the guide face 124.

In addition, each covering member is provided with a guiding lug 128 which is provided therein and which rests on an outer face 132 of a guiding head 130 which is designated 130 as a whole and is arranged at the minimum distance from the corresponding joint 66 on the respective parallelogram brace 56 and which is always movable at a constant distance around a centre 134 of the joint.

The guide face 124, preferably designed in the form of a plane, intersects the outer face 132 of the guiding head 130 in accordance with the setting of the corresponding parallelogram brace 56 along different external contour lines 136 of the outer face 132.

The guiding head 130 is now shaped according to the invention in such a way that the external contour line 136 situated in the plane defined by the guide face 124 has the same shape in all possible positions of inclination of the parallelogram braces 56 about the centre 134 of the joint. In this way, the guiding lug 128 can have a fixed diameter and will thus rest in a sealing and closing manner against the preferably constantly circular external contour line 136 in all positions of the parallelogram brace.

In this way, a joint space 138 receiving the joint 66 is hermetically protected by the protection device 120 against the ingress of chips, and the protection device 120 can be produced in a simple manner from wear-resistant materials by the covering member 122 and the guiding head 130.

The protection device 120 according to the invention has, in particular, the major advantage that the components thereof can be produced from materials which are not susceptible to sharp and/or hot chips and/or corrosive fluids.

The guiding lug 128 is preferably further provided with a wiping means 140 and, in addition, a wiping means 142 is also provided in the region of a transition from the guide face 124 to the covering member 122.

The shape of the outer face 132 of the guiding head 130 can in principle be determined by computer. In the simplest case, however, the outer face 132 can be approximated by a radius R in sectional planes situated parallel to the longitudinal direction of the parallelogram braces, in which case the arc corresponding to this radius R can be determined in a simple manner by the fact that the position of a circular external contour line 136 for the middle position and the extreme positions situated on both sides of the middle position is determined under the premise of the external contour line 136 in the region of the section of the guide face 124 with the outer face 132 and the radius R is calculated therefrom.

In principle, in the case of the solution according to the invention it would also be possible to design the guide face 124 as a convex face and thus to adapt the covering member 122 to the shape of the guide face 124. It is particularly advantageous from the structural point of view, however, if the guide face 124 is a flat face.

In order to provide satisfactory accessibility to the inner space 138 of the joint 66, the covering member 122 is preferably designed in such a way that it can be divided along an axis of symmetry of the guiding lug 128 and can thus be dismantled in a simple manner.

In accordance with the invention the protection device 120 need not be used only for the joints 66 and 68, but it can also be used in the same way for the joints 60 and 62 in the solution according to the invention.

It is even possible to use the protection device according to the invention generally in the region of the machine structure, in particular in the case of machine tools in all those cases in which the previously known solutions with folding bellows give rise to problems.

In order to protect the slide guides 40 and the spindle 46, which both extend along the carriers 20 over the entire path of the slides 42 between an underside 140 of the cross-bracing member 30 and a top 142 of the carrier receiving means 24 of the base body 16, rigid U-shaped coverings 144 and 146 respectively are provided on both sides of each of the slides 42, in which case the covering 144, starting from the respective slide 42, extends in the direction of the cross-bracing member 30 and can be moved therethrough, whereas the covering 146, starting from the respective slide 42, extends in the direction of the base body 16 and, as shown in FIG. 4, enters a recess 148 in the base body 16.

In this case the recess 148 extends preferably from the top 142 of the carrier receiving means 24 of the base body 16 as far as an underside 150 thereof and thus passes entirely through the respective carrier receiving means 24, so that in the event that fluid or chips penetrate into the recess 148 they can escape out of the recess 148 in the region of the underside 150 and can be collected by the chip trough 98.

A wiping means 152 is advantageously provided in the region of a transition between the top 142 and the covering 146.

The covering 146 is dimensioned in such a way that even when the slide 42 is moved in the adjustment direction 76 as far as possible upwards in the direction of the cross-bracing member 30 the covering 146 still enters the recess 148, and when the slide 42 moves in the adjustment direction 76 in the direction of the base body 16 the covering 146 can extend into the recess 148 to an increasing extent.

In addition, the covering 144 is designed in such a way that when the slide 42 is moved downwards to the maximum extent in the adjustment direction 76, i.e. towards the base body 16, the covering 144 likewise still enters at least the cross-bracing member 30, and when the slide 42 moves in the direction of the cross-bracing member 30 the covering 144 passes through the cross-bracing member 30 and then projects upwards to an increasing extent beyond the end 32 of the respective carrier 20, as the slide 42 is moved further in the direction of the cross-bracing member 30.

In this way, in the case of the machine tool according to the invention it is possible, without the use of telescopic plates, to protect linear drives and/or linear guides by rigid U-shaped and dimensionally rigid coverings which are able to enter corresponding recesses in the machine frame.

In order to supply the workpiece spindle 82 with energy or control information or even to interrogate sensors arranged in the region of the workpiece spindle 82, a line train 160 is provided which extends above the cross-bracing member 30 in the form of a reversed U-shaped arc 162, one arm 164 of the latter being arranged fixed relative to the machine frame 10, whereas the other arm 166 of the U-shaped arc of the line train 160 is guided with respect to the workpiece spindle 82.

In order to protect this train 166 [sic] on its path through the operating space 18 to the workpiece spindle 82, a line-train protection designated 168 as a whole is provided, which comprises a rigid tube 170, one end 172 of which carries a spherical attachment sleeve 174 which can be placed with an inner face 176 on a spherical face 178 of a spherical head 180 which is mounted by means of an assembly flange 182 on a rear side 184 of the housing 185 of the workpiece spindle 82 opposite the workpiece receiving means 86.

This spherical head 180 is traversed by an aperture 186 which, starting from an opening 188 facing the housing 185 of the workpiece spindle 82, tapers in cross-section to a minimum cross-section 190 and then widens out again to an opening 192, the opening 192 being directed towards the tube 170 and being situated inside the spherical attachment sleeve 174.

The arm 166 of the line train 160 passing through the tube 170 can be inserted through this aperture 186 into the housing 185 of the workpiece spindle 82.

In addition, the tube 170 is guided so as to be displaceable in the direction of its longitudinal direction in a guide channel 196 of a pivot bearing which is designated 200 as a whole and which preferably has a spherical body 202 traversed by the guide channel 196 and in turn mounted so as to be pivotable and rotatable in an annular body 204 which always rests on the spherical face 208 on both sides of an equatorial line 206 of the spherical body 202 and thus supports the spherical body 202 in a rotatable and pivotable manner on all sides.

In this case the annular body 204 is preferably mounted on a closure wall 210 of the operating space 18, the closure wall 210 being situated for example at the level of the cross-bracing member 30 and preferably being held thereon.

As illustrated diagrammatically in FIGS. 6 to 8, the line-train protection 168 according to the invention allows the arm 166 of the line train 160 to be supplied in a protected manner despite movability of the workpiece spindle 82 inside the movement space 78, the spherical attachment sleeve 174 always remaining mounted on the spherical face 178 of the spherical head 180 and the tube 170 thereby being able to follow all the movements of the spherical head 180 in the operating space 18 on account of the fact that the spherical attachment sleeve 174 is pivotable and rotatable on all sides with respect to the spherical head 180 and, in addition, the tube 170 is displaceable relative to the spherical body 202 in the direction of its longitudinal direction 194 [and] can also be rotated relative to the spherical body 202 about its longitudinal direction 194 as an axis of rotation.

In addition, the pivot bearing 200 allows all degrees of pivoting freedom of the tube 170.

The pivot bearing 200 is preferably arranged centred with respect to the median axis 74, so that in the position of the workpiece spindle 82 centred with respect to the median axis 74 the tube 170 extends with its longitudinal direction 194 likewise centred with respect to the median axis 74 and thus guides the movement of the workpiece spindle 82 in the movement space 78 symmetrical to the median axis 74 towards a corresponding tilting of the tube 170 with respect to the housing 185 carrying the spherical head 180 and the machine frame 10 carrying the pivot bearing 200 as well as a movement of the tube 170 in and out with respect to the the pivot bearing 200.

The line train 160 is preferably still provided with one rotary member 210 which is situated in the region of the arm 164 and one rotary member 212 which is situated in the region of the arm 166 respectively, the rotary members 210 and 212 being intended to be used to prevent the line train from twisting in the region of the arms 164 and 166 respectively.

In addition, a line train 220 guided towards the respective slide is formed in a U-shape in reverse and it is likewise preferably raised above the cross-bracing member 30, a stationary arm 222 being provided, whereas a movable arm 224 is guided under the covering 144 towards the slide 42.

Figure 9:
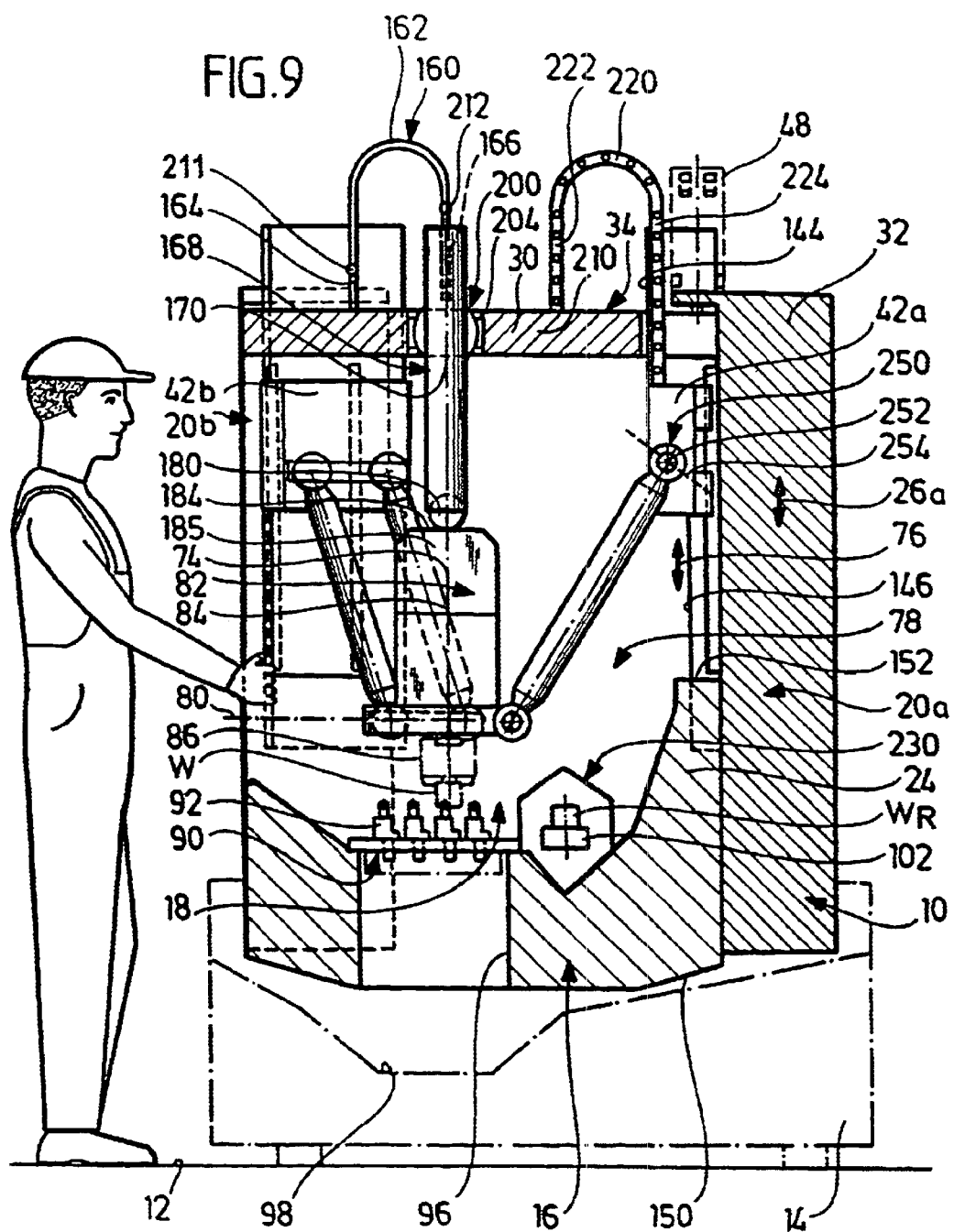
FIG. 9 is a section corresponding to FIG. 1 through a second embodiment.

In a second embodiment of a machine tool according to the invention, illustrated in FIGS. 9 and 10, the parts which are identical to those of the first embodiment are provided with the same reference numerals, so that reference will be made in full to the comments on the first embodiment.

In contrast to the first embodiment, in the second embodiment a covering 230 is provided for the workpiece-supply device 102 in the operating space 18, the covering 230 engaging over the workpiece-supply device 102, in particular in the region of the transfer position 108 and the take-up position 110, when the workpiece W is machined on one of the tools 92.

In this case the covering 230 is preferably provided with an opening 232 which is situated in the region of the transfer position 108 and the take-up position 110 and which can be closed by means of a displaceable covering 234 when the workpiece W is machined by one of the tools 92.

In addition, in the second embodiment, the joints 60 and 62 are not constructed in the form of independent joints, but comprise a common hinge pin 250 which is mounted in the slide 42 so as to be pivotable about a horizontal axis 252 and to which the parallelogram braces 56 and 58 are articulated as axes 254 additionally pivotable about . . . arranged transversely to the axis 252 and pivotable together with the hinge pin 250 about the horizontal axis 252'.

N.B. The original German text is defective, and its sense is difficult to reconstruct.

The joints 66 and 68 are constructed in the same way.

Finally, in the second embodiment the machine frame 10 is designed in the same way as in the first embodiment, so that in its projection onto the base area 12 it has a substantially triangular cross-sectional shape, one of the carriers 20a, 20b, 20c being arranged in each corner of the triangular cross-sectional shape of the machine frame 12 [sic—recte 10].

What is claimed:

1. A machine tool, for the rotary machining of workpieces, comprising:
   a machine frame,
   a workpiece carriers,
   a tool carrier arranged on the machine frame below said workpiece carrier, the tool carrier being adapted to be equipped with a plurality of tools, the plurality of tools being arranged in a two-dimensional pattern, each tool being spaced from the tool next to it, the two-dimensional pattern being adapted to provide at least one aperture in the tool carrier for the removal of chips which drop down,
   a parallel kinematic arrangement, which has three parallelogram guides each being connected in an articulated manner at one end to a receiving means for the workpiece carrier and at the other end to a slide, and
   an N/C-controlled linear drive for each of said slides, said N/C controlled linear drives enabling movement of the workpiece carrier arranged on the receiving means relative to the tool carrier arranged on the machine frame in a three-dimensional movement space.

2. A machine tool according to claim 1 wherein several out of the a plurality of the tools can be used for machining a workpiece.

3. A machine tool according to claim 1 wherein the tool carrier is arranged stationary on the machine frame.

4. A machine tool according to claim 1, wherein chip spaces are arranged between the tools.

5. A machine tool according to claim 1, wherein the tool carrier is arranged in the machine frame above a recess receiving falling chips.

6. A machine tool according to claim 1 wherein the receiving means for the workpiece carrier is held in a suspended manner on the parallelogram guides.

7. A machine tool according to claim 1 wherein the workpiece carrier receives the workpiece in a suspended manner.

8. A machine tool according to claim 1 wherein the workpiece carrier is a workpiece spindle.

9. A machine tool according to claim 8, wherein the workpiece spindle is arranged on the receiving means.

10. A machine tool according to claim 9, wherein the workpiece spindle is movable in the movement space in such a way that all the tools of the tool carrier can be used on the workpiece.

11. A machine tool for the machining of workpieces, comprising:
    a machine frame,
    a tool carrier,
    a workpiece carrier,
    a parallel kinematic arrangement, which has three parallelogram guides each being connected in an articulated manner at one end to a receiving means for one of the workpiece carrier and tool carrier and at the other end to a slide,
    an N/C-controlled linear drive for each of said slides, said N/C controlled linear drives enabling movement of the carrier arranged on the receiving means relative to the machine frame in a three-dimensional movement space, and
    said machine frame comprising a base body adapted to be placed on a setting area and supports for the linear drives projecting from the base body on a side remote from said setting area.

12. A machine tool according to claim 11, wherein the supports are connected to one another by means of a cross-bracing member on their side remote from the base body.

13. A machine tool according to claim 12, wherein the supports are connected to one another by a one-piece cross-bracing member on their side remote from the base body.

14. A machine tool according to claim 12, wherein a movement path of the slides extends between the base body and the cross-bracing member.

15. A machine tool for the machining of workpieces, comprising:
    a machine frame having a base body,
    a tool carrier,
    a workpiece carrier,
    a parallel kinematic arrangement, which has three parallelogram guides each being connected in an articulated manner at one end to a receiving means for one of the workpiece carrier and tool carrier and at the other end to a slide, and
    an N/C-controlled linear drive for each of said slides, the respective linear drive being protected by a dimensionally rigid covering which is moved jointly with the respective slide in a rigid manner, the covering extending at least from the slide as far as the base body in all positions of the slide, and the covering being adapted to enter a covering-receiving means provided in the base body of the machine frame, said N/C controlled linear drives enabling movement of the carrier arranged on the receiving means relative to the machine frame in a three-dimensional movement space.

16. A machine tool according to claim 15, wherein the covering enters a recess provided in the base body.

17. A machine tool according to claim 16, wherein the recess in the base body is open on the side opposite the entrance to the covering.

18. A machine tool according to claim 15, wherein one respective dimensionally rigid-covering for the linear drive extends between the respective slide and a closure of the operating space opposite the base body.

19. A machine tool according to claim 18, wherein in all positions of the slide the covering extends at least as far as the a wall limiting the operating space opposite the base body.

20. A machine tool according to one of claims 15, wherein the respective covering directly adjoins a housing of the slide.

21. A machine tool according to claim 15, wherein each parallelogram guide comprises two parallelogram braces, said parallelogram braces being held on the receiving means by means of a joint situated below a protection device.

22. A machine tool according to claim 21, wherein the protection device comprises a covering member which is connected to a guiding head on the respective parallelogram brace in a movable manner.

23. A machine tool according to claim 22, wherein the covering member is movable on a guiding face in order to follow the movements of the guiding head.

24. A machine tool according to claim 23, wherein in all positions of the parallelogram brace the covering member rests against the guiding head with a guiding lug relative to the receiving means.

25. A machine tool according to claim 24, wherein the guiding head has a shape which in each position of the covering member determined by the guiding face has a bearing contour with substantially the same shape for the guiding lug.

26. A machine tool for the machining of workpieces, comprising
- a machine frame having a base body,
- a tool carrier,
- a workpiece carrier,
- a parallel kinematic arrangement, which has three parallelogram guides each being connected in an articulated manner at one end to a receiving means for one of the workpiece carrier and tool carrier and at the other end to a slide, and
- an N/C-controlled linear drive for each of said slides, said N/C controlled linear drives enabling movement of the carrier arranged on the receiving means relative to the machine frame in a three-dimensional movement space
- a line train to the receiving means movable by the parallel kinematic arrangement,
- a line train protection moveable with respect to the carrier held on the receiving means and the machine frame, the line train protection comprising a tube which is mounted in a pivot bearing arranged on the machine frame on a side of the said carrier opposite to the base body, the tube being extendable in its longitudinal direction.

27. A machine tool according to claim 26, wherein the tube is mounted in a pivotable manner by means of the pivot bearing on a wall limiting the operating space opposite the base body and passes through said wall.

28. A machine tool according to claim 26, wherein the pivot bearing comprises a pivot member for receiving the tube which is mounted in an articulated manner in a pivot-member bearing mounted stationary on the machine frame.

29. A machine tool according to claim 28, wherein the pivot member has a spherical face and is mounted therewith in the pivot-member bearing.

* * * * *